United States Patent
Quinquis et al.

(10) Patent No.: US 6,529,484 B1
(45) Date of Patent: Mar. 4, 2003

(54) ACCESS FOR MOBILE TERMINALS NETWORK

(75) Inventors: Jean-Paul Quinquis, Guirec (FR); Olivier Roussel, Guirec (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/388,096

(22) Filed: Sep. 1, 1999

(30) Foreign Application Priority Data

Sep. 11, 1998 (FR) .............................................. 98 11527

(51) Int. Cl.$^7$ .............................. H04B 7/00; H04Q 7/20; H04L 12/28
(52) U.S. Cl. ............... 370/310.1; 370/331; 370/395.21; 370/395.2; 370/395.3; 455/450
(58) Field of Search .................................. 455/450, 451, 455/452, 509, 510, 454, 455, 515, 516; 370/310.2, 310.1, 328, 338, 329, 395, 469, 434, 437, 431, 331, 322, 349, 385, 397, 399, 395.21, 395.2, 395.3, 395.4, 395.6, 256, 352

(56) References Cited

U.S. PATENT DOCUMENTS

| | | | | |
|---|---|---|---|---|
| 5,487,065 A | * | 1/1996 | Acampora et al. | 370/256 |
| 5,633,868 A | * | 5/1997 | Baldwin et al. | 370/331 |
| 5,751,698 A | * | 5/1998 | Cushman et al. | 370/252 |
| 6,088,346 A | * | 7/2000 | Du et al. | 370/338 |
| 6,094,424 A | * | 7/2000 | Kalmanek et al. | 370/328 |
| 6,195,352 B1 | * | 2/2001 | Cushman et al. | 370/395 |
| 6,335,921 B1 | * | 1/2002 | Quinquis et al. | 370/331 |
| 6,335,929 B1 | * | 1/2002 | Haster | 370/352 |
| 6,349,099 B1 | * | 2/2002 | Larikka et al. | 370/395 |
| 2002/0061101 A1 | * | 5/2002 | Hall et al. | 379/221.08 |
| 2002/0064148 A1 | * | 5/2002 | Hall | 370/352 |
| 2002/0067727 A1 | * | 6/2002 | Gallant et al. | 370/395.2 |

OTHER PUBLICATIONS

A distributed control strategy for wireless ATM networks M Veeraraghavan, et al., 8452 Wireless Networks, Oct. 1, (1995), No. 3, Amsterdam, NL.

Network–based parallel computing over ATM using improved SSCOP protocol Josep Sole–Pareta, Joan Vila–S-allent, Computer Communications 19 (1996) 915–926.

Distributed Call Processing for Wireless Mobile Networks Thomas F. La Porta, et al., Bell Labs Technical Journal, Autumn 1996.

Terminal Detach Scenarios in Future Mobile Telecommunications J. G. Markoulidakis and M. E. Anagnostou, International Journal of Wireless Information Networks, vol. 1, No. 4, 1994.

* cited by examiner

Primary Examiner—Tracy Legree
(74) Attorney, Agent, or Firm—Michael Best & Friedrich LLC (57) ABSTRACT

An access network for mobile terminals has a switching circuit (VCX) connected to at least one other external network and to a local access network (RLA) which has a number of radio terminals (BR) for providing communication with mobile terminals (MT). Set-up and release protocols provide for signaling channels and user channels between switching circuit (VCX) and a mobile terminal (MT). Security protocol (SSCOP) provides for the channels implemented by exchanging signaling messages at the level of switching circuit (VCX) and mobile terminals (MT). An adaptation server (ARX) intercepts the messages sent by the signaling protocols and implements the intercepted messages. Management protocols of the local access network (RLA) oversee set up and release of the signaling channels and the user channels and reserves corresponding radio resources for the signaling channels.

15 Claims, 5 Drawing Sheets

ACCESS FOR MOBILE TERMINALS NETWORK

The present invention concerns an access network for mobile terminals of the type which consists of a switching circuit connected, on the one hand, to at least one other external network and, on the other hand, to a local access network which is itself connected to a number of radio terminals, each terminal being provided for communicating with mobile terminals.

BACKGROUND OF THE INVENTION

The present invention falls within the framework of access networks for mobile units based on the ATM (Asynchronous Transfer Mode) technology. More precisely, it concerns access networks for mobile units which are based on the end-to-end ATM technology, both at the control level and the user level. Consequently, the mobile terminals envisaged in the present invention support applications which justify the use of this ATM technology provided for the transfer of data at increased flow rates. Among these applications, the following could be cited by way of example: videophony, data transmissions at high rates of flow, consulting Internet servers, etc.

In known mobile access networks, the ATM technology is only intended for access to the radio terminal, still called base station. In these known networks, the mobile terminals are unable to support protocol cells which are specific to this ATM technology, namely level 2 security protocols such as the standard protocol SSCOP and the set-up/release protocols such as the standard protocol Q2931. Also, the field of application in this case is generally cellular radio communication networks.

In a wideband network such as the ATM-type network, the signalling connections are secured at level 2 by a security protocol like the standard one called SSCOP. Thus, the routing of messages signalling the set-up/release of connections at the user level, as those sent by the standard protocol Q2931, supposes then the prior establishment of a level 2 connection.

It will be recalled that the SSCOP protocol ensures, in particular, the securing of signalling connections and permanently controls the integrity of the connections between the terminals MT and switching circuit VCX.

In the case of a network for stationary terminals, the virtual connection which transmits the cells of signalling messages between a terminal and its connecting switching circuit is permanent so that the security protocol SSCOP is automatically released as soon as the terminal is switching circuited on and it permanently controls the integrity of the connections established between the switching circuit and the terminal, even if no data is exchanged at the user level. Thus, these connections secured by the implementation of the SSCOP protocol are only cut off when the terminal or the switching circuit are switched off or, perhaps, when the physical connection between the terminal and the switching circuit is cut.

In the case of a network for mobile terminals, the maintenance of such a virtual connection cannot be permanently assured to the extent where it uses radio resources and the fact that the latter are scarce and costly.

Moreover, a local access network for mobile terminals ATM has, vis-à-vis access networks for stationary terminals, differences which raise specific problems, in particular when signalling procedures are implemented. These problems are noted below.

In addition to processing calls by the switching circuit, a network for mobile terminals integrates the set-up and release functions for internal virtual connections and reserves ATM resources and radio resources. These operations are managed call by call.

Moreover, incoming partial calls when a terminal of network can be called by another terminal using a localization procedure or paging the terminal called by broadcasting a request through all the mobile terminals located in the area covered by the network.

SUMMARY OF THE INVENTION

The object of the present invention is to propose an access network for mobile terminals in which the connections for the transmission of security messages sent by the SSCOP security protocol are managed on request, i.e., only for the duration of the communications. Moreover, a network of this type solves the aforementioned problems.

To this end, an access network for mobile terminals according to the invention is characterized therein that the protocols for establishing and releasing signalling channels and user channels between said switching circuit and a terminal and the security protocols of said channels are implemented only at the level of said switching circuit and said terminals, by exchanging signalling messages between them and therein that it comprises an adaptation server which is provided for intercepting messages sent by said signalling protocols in a transparent manner, and to implement, dependent on the contents of said intercepted messages, management protocols of said local access network in order to set up and release the signalling channels and the user channels in said local access network and to reserve the corresponding radio resources for them.

According to another characteristic of the invention, when the switching circuit receives a request for a connection with a terminal which is located in the area covered by said network, a terminal paging procedure is initiated by said adaptation server to which the said terminal responds by reserving the radio resources required for the signalling traffic and by sending an acknowledgement message, said server then determining the identifiers of a signalling channel in said local access network and establishing said signalling channel.

According to another characteristic of the invention, when said switching circuit receives a request for a connection with a terminal which is in the area covered by said network, it sends a release message of the security protocol, the interception of which by said server releases said terminal paging procedure, said terminal transmitting an acknowledgement message when said signalling channel is set up between the said terminal and said switching circuit.

According to another characteristic of the invention, if the switching circuit has not received the acknowledgement message after a set time has expired, it sends a new release message for the security protocol, the number of times that the switching circuit resends the release messages for the security protocol being limited, for example, to five.

According to another characteristic of the invention, it comprises a server through which all the signalling messages pass to the said switching circuit, the said server, on receipt of a message requesting a connection with a terminal which is within the area covered by said network, transmitting to the server a message so that it releases said terminal paging procedure, said terminal transmitting an acknowledgement message when said signalling channel is set up between said terminal and said switching circuit.

According to another characteristic of the invention, when a terminal is in the area covered by said network makes a call, it reserves the radio resources necessary for the signalling traffic and sends a message requesting a connection to the single adaptation server which then determines the identifiers of a signalling channel in said local access network and sets up said signalling channel.

According to another characteristic of the invention, said message contains the temporary logical address which was assigned to said terminal when it was in the dormant state in the area covered by said network, said server, on receipt of said message, establishing an agreement between said address and said identifiers of said signalling channel.

According to another characteristic of the invention, at the end of the establishment of said signalling channel, said signalling protocol for the security of the connection between the switching circuit and said terminal is released.

According to another characteristic of the invention, once the signalling channel has been set up in said local network and after the release of the security protocol, the protocol for establishing the connection at the user level is implemented, the adaptation server intercepting the messages sent by said protocol in order to reserve the radio resources required for the user traffic and set up a user channel in said local access network.

According to another characteristic of the invention, said local access network consists of a distribution network connected, for its connection to the switching circuit, to a virtual path mixer, said adaptation server being shunt-connected with said mixer in such a way that only the cells having the identifiers of the specific channels or the identifiers of the signalling channels in their heading at the level of said switching circuit or at the level of said terminals, pass through the adaptation server.

According to another characteristic of the invention, a permanent point-to-point channel is established between each of the terminals and the adaptation server for transmitting cells bearing said message for requesting a call coming from said calling terminal which is in the area covered by the corresponding terminal or the cells having a terminal-paging acknowledgement message.

According to another characteristic of the invention, between the adaptation server and each terminal, a permanent virtual path is established for the transmission of cells bearing the acknowledgement for the signalling channel set-up, said cells having an identifier of the virtual circuit equal to the identifier of the virtual circuit of said signalling channel.

According to another characteristic of the invention, a permanent point-to-multipoint channel is set up between the adaptation server and the terminals of said network for broadcasting the terminal-paging message.

According to another characteristic of the invention, when said adaptation server intercepts a release message coming either from the switching circuit or a terminal, it orders the release of the partial connections in the local access network and radio resources.

According to another characteristic of the invention, it comprises means for concealing, for a preset period of time, the release messages of the security protocol sent by switching circuit or a terminal when the release of the signaling channel has taken place.

BRIEF DESCRIPTION OF THE DRAWINGS

The above-noted characteristics of the invention, as well as others, will become clear from the following description of an example of an embodiment, said description being made with reference to the attached drawings, in which.

The above-noted characteristics of the invention, as well as others, will become clear from the following description of an example of an embodiment, said description being made with reference to the attached drawings, in which.

DETAILED DESCRIPTION OF THE INVENTION

Figure 1:
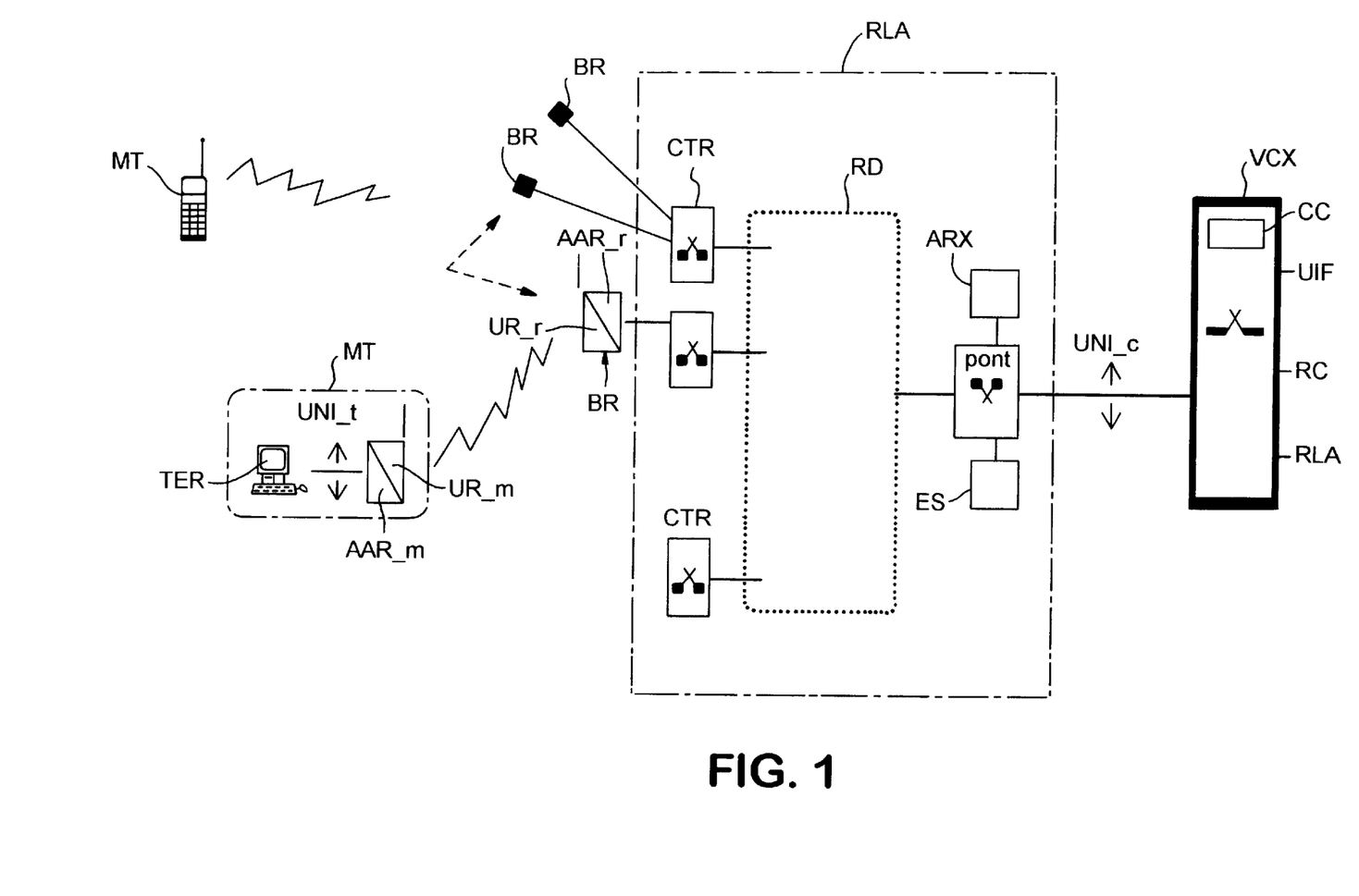
FIG. 1 is a schematic diagram of an access network for mobile terminals according to the invention.

The access network for mobile terminals RLA, shown in FIG. 1, essentially consists of a switching circuit VCX, a local access network RLA and radio terminals BR. They are to be used for communicating with mobile terminals MT.

The local access network RLA is connected, upstream, to the switching circuit VCX via, at the level of the ATM layer, at least one standard interface $UNI_{13}$ c (User Network Interface) and, downstream, to the radio terminals BR. It consists of a distribution network RD connected, on the one hand, to a set of concentraters CTR to which the terminals BR are connected and, on the other hand, to a virtual ATM-type path mixer PONT ensuring the connection of the distribution network RD to the switching circuit VCX.

The distribution network RD and the mixer PONT effect the functions of mixing virtual paths VP. These paths are permanent and established when the system is in service. Each of them is dedicated to a given type of traffic (user information, signallin g, etc.). Their topology is star-type with merger in ascending direction (terminals BR toward switching circuit VCX) and distribution in descending direction (switching circuit VCX toward terminals BR). They are identified by virtual path identifiers VPI as set out below.

The mixer PONT enables, moreover, the passage of the user information flow or signalling through or to the various equipment servers, like the one referred to as ES. These equipment servers can, for example, be a transcoder, a macrodiversity operator, a processing unit for a security protocol, a protocol server for control of the flow, etc.

Another server ARX is shown, the structure and functioning of which is described below.

The concentrators CTR, according to a given marking of the virtual circuit, effects the set-up and release of partial virtual connections during the call set-up and cut-off phase and, perhaps, during the phases where a mobile unit is simultaneously communicating with two terminals BR connected to the local network RLA. These latter phases are called handover phases.

Virtual connections between the radio terminals BR and the access to the mixer PONT are called partial connections.

It will be noted that all of the partial connections which lead to the communicating terminals MT have a star-like topology and are of the point-to-point type. In fact, they all converge toward the interface UNI_c connecting the access network RLA to the switching circuit VCX.

Each radio terminal BR consists of an adaptation ATM/radio unit AAR_r connected, upstream, to a concentrator CTR and, downstream, to a radio unit UR_r which is specific to the radio system used. Each mobile terminal MT consists essentially of a terminal TER of the ATM type, conforming completely to the standards and which is connected to an adaptation ATM/radio unit AAR_m via, at the level of the ATM layer, an interface UNI-t. The unit AAR_m is itself connected to a radio unit UR_m which is provided to enable communication with the radio unit UR_r of each terminal BR of the network. The unit UR_m is specific to the radio system used. Physically, the terminal TER, the adaptation unit AAR_m and the radio unit UR_m can be integrated in the same equipment or, alternatively, be separate.

The terminal TER supports the protocol cells for wideband signalling which are, for example, on the one hand, those of the level 2 layer called SSCOP (service-specific connectionoriented protocol) of the adaptation layer S-AAL and, on the other hand, that of the level 3 layer which is specified in the recommendation ITU Q2931.

It will be remembered that the protocol SSCOP ensures the security of signalling connections and permanently controls the integrity of the connections between the terminals MT and the switching circuit VCX. This protocol is released by a release message BEGIN sent simultaneously by the switching circuit VCX and by the terminals MT and for which an acknowledgement BEGIN_Ack is expected. At the end of this acknowledgement, this protocol enables the periodic sending of test messages POLL for which the result STAT is also expected.

With respect to the set-up/release protocol Q2931, it is provided to ensure the set-up and release of communications and, to do so, it transmits request messages for which it expects acknowledgements. Among these, the request for Setup message Setup indicating a request for a set-up can be cited. An acknowledgement message called Call_proceeding is sent in response to such a request. The message to begin the connection procedure Connect and its acknowledgement Connect_ack can be cited. In addition, the release connection message Release and its acknowledgement Release_comp can be cited.

Each terminal can offer various teleservices such as telephony, access to the Internet and any type of multimedia services, etc.

The switching circuit VCX is connected upstream, for example, to one or more other local access networks for mobile units RLAM having a structure that is identical to or not identical to the one shown in FIG. 1 and to one or more networks switched to stationary terminals RC.

The role of the switching circuit VCX is to establish communications call by call from and to the mobile units MT connected to the mobile access network RLAM. It is done under the control of a call control unit CC (Call_Control).

More precisely, the partial connections ensures the cell traffic at the user level are connected in the switching circuit VCX, either to the outgoing connections if these are communication calls to outside of the network RLAM, or to partial connections attached to each mobile unit if these are local communications between 2 mobile units connected to the network RLAM.

The calling procedure can be relayed to one of the networks to which the switching circuit VCX is linked, this can necessitate equipment called an interfunctional unit UTF to ensure bridge-to-bridge functions if the signalling systems are different.

At the interface UNI_r, terminal side MT, whether at the user level or control level, the identifier VPI of the virtual path is unique and is generally like access networks for stationary terminals, equal to zero. With respect to the virtual circuit identifier VCI at the user level, it is selected, for a given communication, by the switching circuit VCX at the time the call is set up, implemented by the set-up/release protocol Q2931 and is maintained for the entire duration of the communication. It is called VCI_dat in the following. At the control level, it has a fixed value once and for all, for example, equal to five (standard value).

At the interface UNI_C, at the switching circuit end VCX, at the user level and at the control level, the virtual path identifier is equal to the VPI_U value allocated to the terminal MT when it enters the area covered by the access network for the mobile terminals RLAM in question. It can be done either by reactivating its dormant state or with an already existing communication and arriving accordingly from another access network for mobile terminals RLAM. With respect to the virtual circuit identifier VCI, it has a value which is, at the user level, equal to that of VCI_dat which was allocated, by the switching circuit VCX, to the above interface UNI_t. With respect to the control, the identifier VCI is also equal to that allocated to the interface UNI_t, for example, five.

In the local access network RLA, every type of traffic (user information, signalling) is transmitted in permanent virtual paths VP which are dedicated thereto. In ascending direction (terminals MT to switching circuit VCX), the origin of these virtual paths VP are the concentrators CTR and they make it possible to switch the traffic which they are transmitting toward the appropriate direction: the switching circuit VCX, a server ES such as adaptive equipment, a transcoder, a macrodiversity operator, a processing unit for a security protocol, or the adaptation server ARX. In descending direction, they switch the traffic toward all the concentrators CTR. The topology of virtual paths VP is then a merger in ascending direction and a distribution in descending direction. By way of example, the VPI assigned to a communication at the user level is equal to 100.

Inside a given path VP, the partial connections are distinguished with the aid of a virtual circuit identifier VCI. These are vitual circuit identifiers VCI at the control level called VCI_sig provided to support the end-to-end signalling and enabling, in particular, the transmission of messages generated by the security SSCOP and set-up/release Q2931 protocols; these are again virtual circuit identifiers VCI at the user level VCI_dat used to identify the partial connections supporting user traffic.

For this use of virtual path and circuit identifiers as is going to be explained, translation operations are carried out at the level of terminals BR and at the level of the mixer PONT.

As mentioned above, the local access network RLA again comprises an adaptation server ARX whose function, clarified below, is the establishment, the disconnection, the mobility of bidirectional connections which assure the transmission of user information traffic and the transmission of signalling messages in the local network RLA.

The adaptation server ARX can be connected in one of the following ways. It can be connected on the switching circuit VCX as server. It can also be connected by cutting the multiplex UNI_c linking the access network RLA to the switching circuit VCX. It can finally be shunt-connected on the access network RLA via the mixer PONT.

With respect to the physical access ports, the adaptation server ARX can have only one bidirectional access or 2 bidirectional accesses, one access for the descending direction of the cells (switching circuit VCX toward radio terminals BR) and one access for the ascending direction (radio terminals BR toward switching circuit VCX).

The shunt connection on the mixer PONT of the adaptation server ARX with only one bidirectional access has the advantage that the adaptive signalling function to the mobility problems remains localized in the access network RLA so the switching circuit VCX can be standard ATM equipment provided originally for a stationary network.

According to the invention, the adaptation server ARX is transparent with respect to the user cells. Only those cells carrying signalling messages pass through the server ARX. To do so, only the cells which are turned toward the server ARX are the cells that contain, in their headings, at the level of the UNI_c or UNI_t, a virtual circuit identifier VCI equal to 5, a value which in effect indicates that these cells belong to the signalling messages and that they come from the switching circuit VCX or the distribution network RD.

Figure 2A:
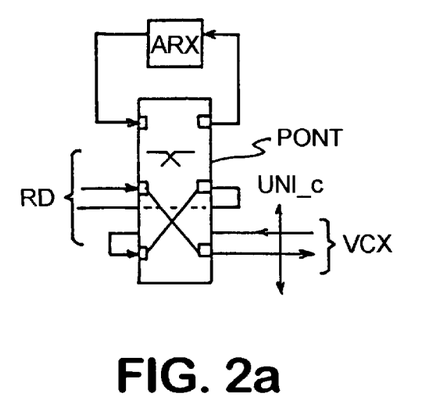
FIGS. 2a to 2d are schematic diagrams showing the virtual connections of the mixer to the adaptation server of an access network for mobile terminals according to the invention.

FIG. 2a shows the connections in the mixer PONT with respect to the user cells. The cells that come from the distribution network RD are transmitted on the interface UNI_c to the switching circuit VCX and the cells that come from the switching circuit VCX are transmitted to the distribution network RD. These cells do not pass through the adaptation server ARX.

Figure 2B:
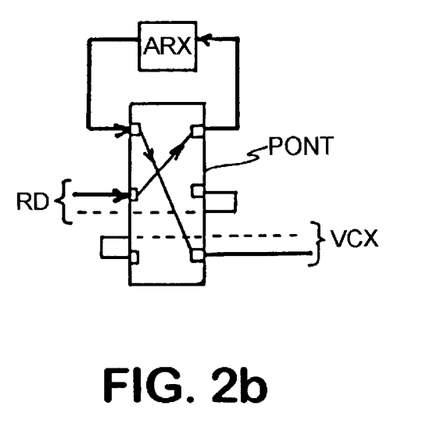
Figure 2C:
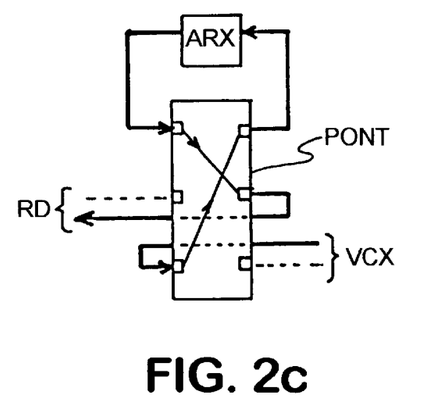

FIG. 2b shows the connections in the mixer PONT with respect to the ascending signalling cells (radio terminals BR toward switching circuit VCX) and FIG. 2c shows the connections for the descending signalling cells (switching circuit VCX toward radio terminals BR).

In FIG. 2b, the cells coming from the distribution network RD are shunted, in the mixer PONT, to the input of the adaptation server ARX, subsequently pass through the latter and are then again delivered to the mixer PONT where they are reshunted toward the switching circuit VCX.

In FIG. 2c, the cells coming from the switching circuit VCX are shunted, in the mixer PONT, to the input of the adaptation server ARX, pass through the latter and then again delivered to the mixer PONT where they are reshunted toward the distribution network RD.

The cells which pass through the server ARX have different virtual path identifiers depending on their origin, either terminals MT or switching circuit VCX. For example, the identifier VPI=10 indicates that these are cells belong to the signalling messages coming from the switching circuit VCX and the identifier VPI=11 indicates that these are signalling cells coming from the network RLA, i.e. mobile terminals MT.

Figure 2D:
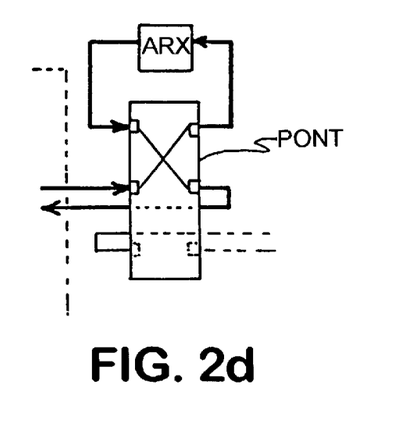

FIG. 2d shows the connections for the internal signalling cells in the local access network RLA. These cells, as will be seen in the following, have messages belonging to the protocols specific to the local access network RLA used at the level of the server ARX, for example, to ensure the paging function for the physical address of a given terminal (function called PAGING) or the set-up and release functions of the connections in the local network RLA, here called PRSS functions. As will also be seen in the following, the ATM cells which have these specific messages will be identified by the reserved virtual path VPI and virtual circuit identifiers VCI.

The adaptation server ARX is provided to intercept all signalling messages exchanged between the switching circuit VCX and the mobile terminals MT, also in both the ascending direction and the descending direction. These are then level 2 messages (for example, the messages sent when the security protocol SSCOP is implemented) and level 3 messages (for example, set-up/release messages sent when the protocol Q2931 is implemented).

On receipt of the ATM signalling cells, the adaptation server ARX reconstructs the signalling messages by reassembling these cells. To do this, a type-5 (AAL5) ATM adaptation layer is advantageously implemented, the functions of which are described in the recommendations of the ITU.

The adaptation server ARX analyzes and decodes the messages received and, depending on the nature and contents of these messages, it perhaps releases an action which can be the implementation of a signalling protocol specific to access networks RLA, either a terminal-paging protocol, a protocol generally known under the term PAGING, or a management protocol PRSS of the connections in the local network RLA, for example, set-up/release of connections, management of ATM resources and radio resources of the access network RLAM. It might also release the sending of trace messages taking into account the activity on the signalling connections. This function can be used by the administrator of the network for maintenance requirements and statistical traffic controls.

It will be noted that these specific protocols concern the adaptation server ARX and the terminal equipment which are the radio terminals and the mobile terminals. Also, the messages exchanged by these specific protocols are conveyed by permanent channels constructed in the access network RLA. Thus, these channels have reserved virtual path VPI and virtual circuit identifiers VCI. To circulate terminal-paging messages (PAGING), these permanent channels are of the distribution type in descending direction from the server ARX toward the mobile units MT and point-to-point with merging in ascending direction. With respect to the messages sent by the connection management protocol in the network RLA, these channels are of the point-to-point type in the 2 directions.

Advantageously, these specific protocols (terminal PAGING and connection management PRSS) use either the message formats limited to the size of an ATM cell, or formats of the type of those of the adaptation layer AAL5. In the first case, the procedures are simpler and, in the second case, they are more secure. In any event, according to the present invention, these signalling messages are not secured by an SSCOP-type security protocol.

After having decoded a message and released an action, the server ARX segments this message and retransmits it in the form of ATM cells. If the message comes from the switching circuit VCX, it will be retransmitted to a terminal MT. On the other hand, if the message comes from a terminal MT, it will be retransmitted to the switching circuit VCX. It will be remembered that the origin of these messages is determined by the server ARX dependent on the virtual path identifiers VPI carried by the headings of the ATM cells. The direction is also determined by the virtual path identifier VPI.

The server ARX, for this resending, advantageously uses a type-5 (AAL5) ATM adaptation layer, the functions of which are described in the recommendations of the ITU.

It can be seen that the server ARX is completely transparent vis-à-vis the intercepted messages, both on the semantic and on the temporal level. In other words, the contents of the messages are not modified and travel time in the server ARX is sufficiently short so that the exchange protocols are not affected and, for example, that the waiting time switches do not arrive unduly delayed, or in the switching circuit VCX, or in the terminal MT. It will be understood that, a fortiori, the server ARX does not eliminate any message.

In the continuation of the present description, all of the signalling messages exchanged between a calling mobile terminal MT and the switching circuit VCX will be called "outgoing partial call" and all of the signalling messages between the switching circuit VCX and a called mobile terminal MT "incoming partial call".

According to the invention, to establish a connection at the user level, a preliminary calling phase is entered, followed by an actual calling phase. As will be understood in the following, the first phase enables the opening of a signalling channel while the second phase permits the opening of a user channel for the transmission of information associated with the user traffic.

To open these channels, the exchange of signalling messages between the terminals MT and the switching circuit VCX comply with the recommendations described in the standards. The terminal ATM equipment thus has standard protocol cells, for example, the protocol cells SSCOP and Q2931.

It will be remembered that to set up and release a user channel, the level 3 protocol, i.e. standard Q2931, is used. To route signalling message of this protocol Q2931, the signalling connections must be secured, which involves a prior use of a level 2 protocol, i.e. the SSCOP standard. This security protocol SSCOP permanently controls the integrity of the connections between the terminals MT and the control functions implanted in the switching circuit VCX.

The maintenance of a connection to ensure the transmission of messages sent by the security protocl SSCOP can not be assured permanently since it would use radio resources which are scarce and expensive. According to the invention, every call is secured by implementing the SSCOP-type security protocol, but it is in reality a group of connections which is established on demand between, on the one hand, the switching circuit VCX and, on the other hand, all of the terminals MT in the calling phase and in the communication phase. For a given terminal MT, any connection between the switching circuit VCX and this terminal MT is established during the set-up phase of a call and disconnected during the release phase of the communication. The SSCOP security protocol cells are only implanted in the switching circuit VCX and in the terminals MT, this brings the advantage that it is simpler and less costly in equipment.

Similarly, the set-up/release protocol cells Q2931 of the user channels are only implanted in the switching circuit VCX and in the terminals MT.

The procedures for establishing the connections to transmit the messages sent by the security protocol SSCOP and the setup/release protocol Q2931 are different depending on whether it is an incoming partial call or an outgoing partial call.

Figure 3:
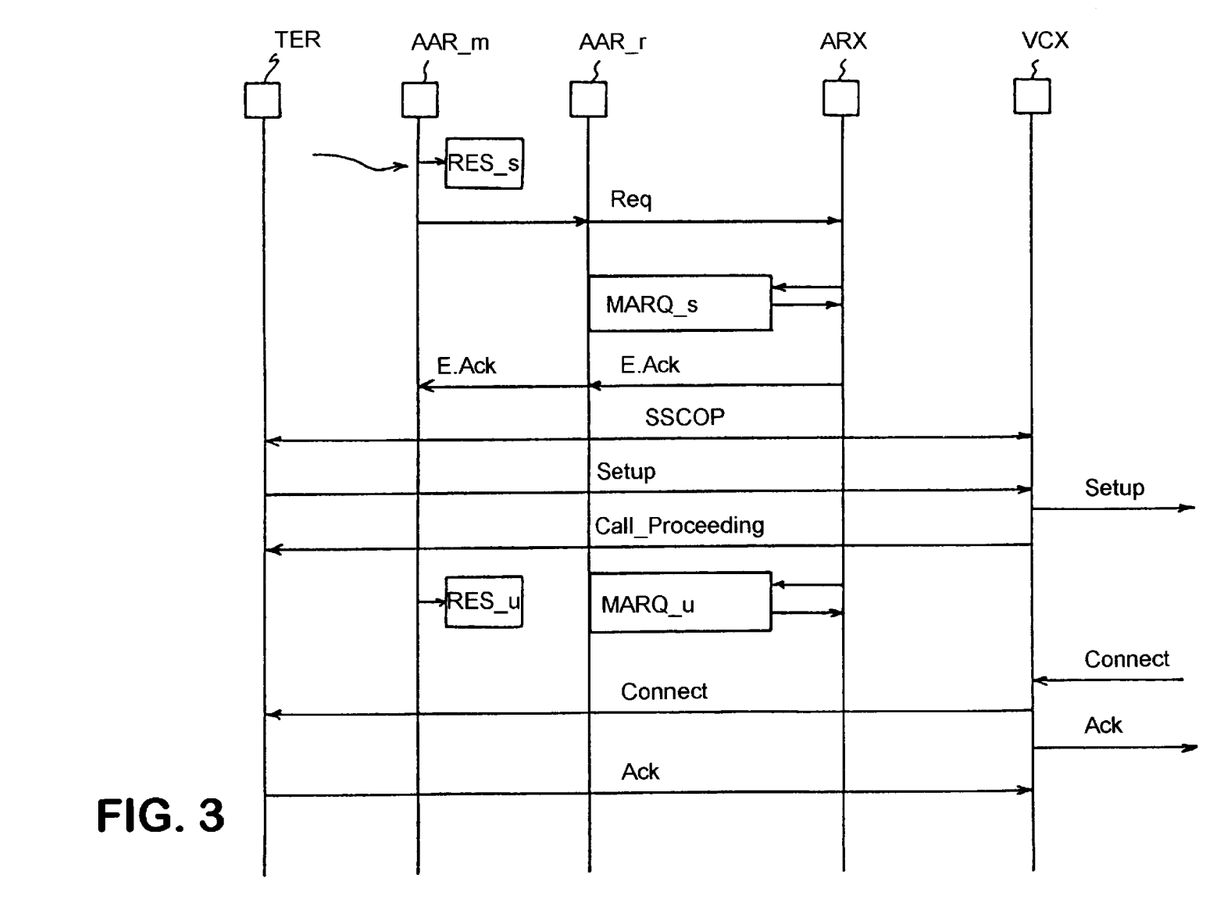
FIG. 3 illustrates the functioning of a network according to the invention in the case where a terminal in the area covered by said network calls another terminal.

We are now going to consider, with reference to FIG. 3, the setting up of a communication when the terminal is calling. Thus, this is an outgoing partial call.

The calling terminal MT reserves, by implementing the protocol RES_s, the radio resources necessary for routing the signalling traffic and sent, via the radio connection thus formed between the units AAR_m and AAR_r, a call message Req to the adaptation unit AAR_r of the radio terminal BR where the terminal is located. It addresses the message Req to the server ARX via a special channel, the reserved virtual path and circuit identifiers of which are respectively VPI_rss and VCI_rss. This channel is permanent and is defined by each terminal to address the server ARX.

The server ARX determines a virtual signalling circuit identifier VCI_sig and establishes a correspondence between the temporary address @mobile contained in the message Req and the identifier VCI_sig. This temporary address @mobile was allocated to the mobile unit even though it was in the dormant state in the area covered by the access network for mobile units RLAM.

The server ARX then activates the management protocol PRSS for the network RLA to effect the marking command MARQ_s of a signalling channel in the access network RLA, the virtual circuit identifier of which is VCI_sig. It will be noted that the establishment of the virtual circuit identifier VCI_sig is sufficient for defining a signalling channel in the local network RLA to the extent where all signalling messages are carried by a permanent predefined signalling path in the network RLA.

At the end of this marking, the server ARX sends a set-up acknowledgement message E_Ack to the terminal BR in question via a channel identified by the virtual path identifier VPI_st x and the virtual circuit identifier VCI_sig of the signalling channel previously defined by the network RLA. The virtual path identifier VPI_st_x is the permanent path established between the server ARX and the particular terminal BR identified by x. A set of point-to-point paths must then be constructed in the local access network RLA to ensure the transmission of signalling information between ARX and the terminals BR.

The acknowledgement message Ack is then received by the terminal MT.

At this stage, there is, between the terminal MT and the switching circuit VCX, an open virtual connection identified, in the local network RLA, by the identifier VCI_sig. The security protocol SSCOP, implanted only in the switching circuit VCX and in the terminal MT, is now implemented. In compliance with the standard, it consists of sending a release message of the security protocol BEGIN, its acknowledgement response and then periodical test exchanges POLL acknowledged by the responses STAT.

The subsequent calling phase takes place by using the signalling channel which was set up above. It consists, for example, of implementing the standard protocol Q2931. In accordance with this standard, a Setup request message is sent from the terminal MT. The switching circuit VCX analyzes the contents of the Setup message and responds by an acknowledgement message Call_Proceeding which contains the virtual circuit identifier VCI_dat allocated to the communication. The Setup message is sent in the direction of the called terminal with which the calling terminal MT wishes to communicate. It will be noted that this terminal can be local (in the area covered by the local access network RLAM) or, on the other hand, outside of this area.

The server ARX intercepts the acknowledgement message Call_Proceeding sent by the switching circuit VCX and then again activates the management protocol PRSS of the local network RLA. It then proceeds to the marking MARQ_u of a partial ATM connection in the local network RLA, the virtual circuit identifier VCI_dat of which is the one which was allocated by the switching circuit VCX. This protocol PRSS is also going to reserve, by the implemention of the protocol RES_u, the radio resources required for routing the user traffic. The messages sent by the protocol PRSS are transmitted in the local access network RLA on an ATM channel identified by a reserved virtual path identifier VPI, for example 80, and the virtual circuit identifier VCI-sig allocated to the signalling channel.

During this time, the calling procedure takes place between the switching circuit VCX and the called terminal. On receipt of the connection message Connect sent by the called terminal, the switching circuit VCX addresses, to the calling terminal, a message Connect and, to the called terminal, a connection acknowledgement message Ack.

On receipt of this message Connect, the calling terminal MT addresses to the switching circuit VCX a connection acknowledgement message Ack. The communication is set up.

The user traffic is transmitted, in the local network RLA, on the partial connection identified by the virtual circuit identifier VCI_dat. With respect to the traffic of messages sent periodically over the entire duration of the call by the security protocol SSCOP (instructions POLL and STAT) to control the integrity of this partial connection, it is transmitted on the partial connection identified by the virtual signalling circuit identifier VCI_sig.

Figure 4:
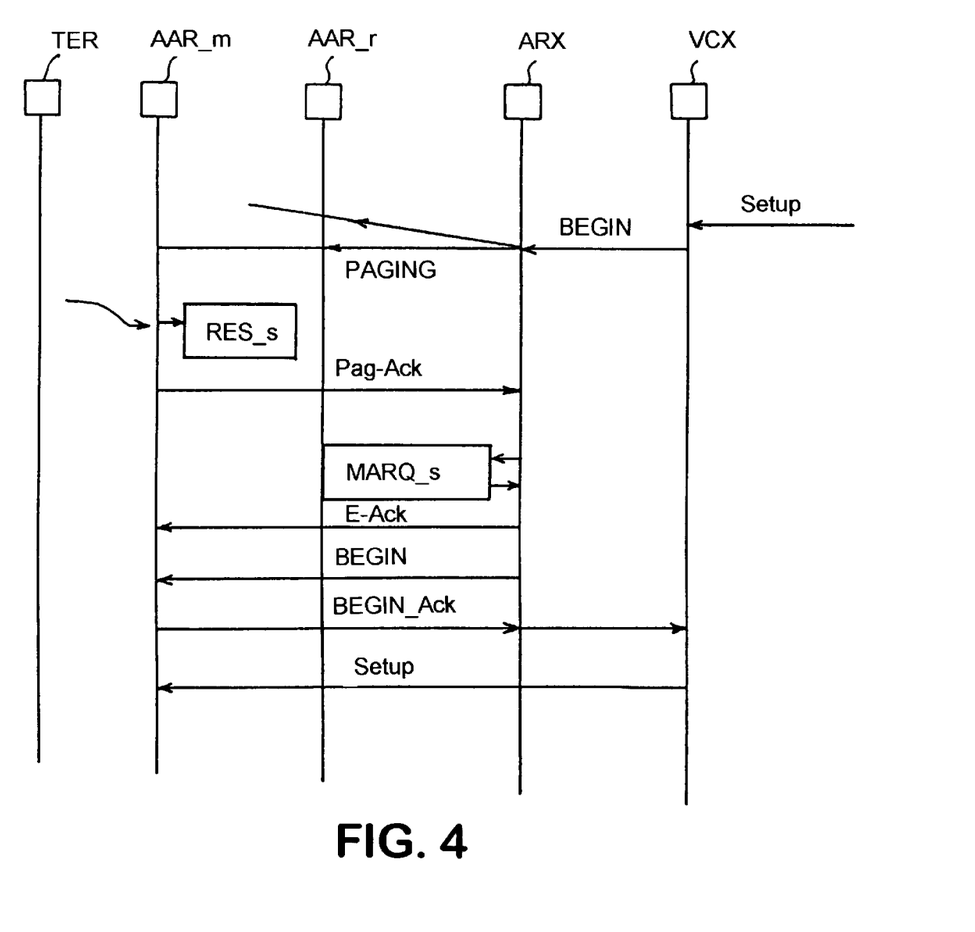
FIG. 4 illustrates the functioning of a network according to the invention in the case where any terminal whatsoever calls another terminal in the area covered by said network.

The procedure for a call coming from a calling terminal and addressed to a called mobile terminal will now be considered with reference to FIG. 4. The called mobile terminal MT is located inside the geographic area covered by the radio terminals of the access network RLAM. It has already been identified by a virtual path identifier VPI_u, but the physical address of the radio terminal BR in which it is located (or was located) is not known.

In this situation, the switching circuit VCX receives a connection request message Setup which comes from the Setup request procedure Q2931 of the calling terminal. Ascertaining that the level 2 connection does not exist, the switching circuit VCX activates the security protocol SSCOP and initiates, due to this fact, a tentative procedure for setting up this connection. To do so, it sends a release message BEGIN, to which it awaits a response.

The Setup request message has the number (code E164, for example) of the called terminal. This terminal, if it is in the dormant state in the area covered by the RLAM, is identified in an allocation table of the switching circuit VCX and made to correspond with a virtual path identifier VCX_u. The message BEGIN of the SSCOP protocol is then transmitted by the virtual signalling channel identified by this identifier VPI u and by the reserved virtual signalling circuit identifier, for example 5.

The adaptation server ARX intercepts the release message BEGIN of the security protocol SSCOP and then releases a terminal paging protocol, called PAGING. It establishes a correspondence between the identifier VPI_u carried in the heading of the cells of the release message BEGIN and the logical address @mobile of the called terminal. The PAGING protocol message which contains the logical address @mobile of the called terminal is distributed to all mobile units located in the RLAM network.

It will be noted that the PAGING protocol message is transmitted on a permanent distribution channel, the virtual conduit path and circuit identifiers VPI_pag and VCI_pag are reserved.

Whoever has the logical address @mobile recognizes the recipient of the PAGING protocol message and then activates the RES_s procedure for reserving the radio channels for the signalling traffic. Moreover, an acknowledgement message Ack is sent to the server ARX. This message is transmitted by a permanent channel defined by each terminal for addressing the server ARX.

As previously, the server ARX determines a virtual signalling circuit identifier VCI_sig and establishes a correspondence between the temporary logical address @mobile and the identifier VCI_sig. The server ARX then activates the management protocol PRSS of the local network RLA, which results in ordering the marking MARQ_s of a signalling channel VCI_sig in the access network RLA.

At the end of this marking, the server ARX sends an acknowledgement message E_Ack to the terminal BR in question via a channel identified by the virtual path identifier VPI_st_x and the virtual circuit identifier VCI_sig of the signalling channel previously defined by the network RLA. The virtual path identifier VPI_st_x is the permanent path established between the server ARX and the particular terminal BR identified by x. The acknowledgement message E_Ack is then received by the terminal MT.

At this stage, there is a virtual open connection between the terminal MT and the switching circuit VCX, identified by the identifier VCI_sig in the local network RLA.

The release message BEGIN which released the terminal-paging protocol PAGING was temporarily stored in the adaptation server ARX until the radio resources and ATM were reserved. Now that the signalling channel is open, the BEGIN message is sent by the adaptation server ARX to the destination of the called terminal, which then acknowledges it by sending an acknowledgement message BEGIN_Ack to the switching circuit VCX. The level 2 connection is established. The switching circuit VCX confirms it and immediately sends, in direction of the terminal MT, a Setup request message which then initiates the proper calling procedure.

The continuation of the procedure is identical to the one which was used for the outgoing partial calls.

It will be noted that the switching circuit VCX should only send release messages BEGIN when, on the one hand, the Setup request messages are decoded and when, on the other hand, the connection for the transmission of messages from the security protocol SSCOP has not as yet been established. In fact, in addition to this particular case, it should not send such BEGIN messages when the internal connections in the local network RLA and the radio connections have been released, which would result in reinitiating the PAGING call procedure.

To solve this problem, it is proposed that, in the event that the release message BEGIN sent by the switching circuit VCX is not acknowledged within a preset period of time, confirming the establishment of a level 2 connection between the called terminal MT and the switching circuit VCX, a new release message BEGIN is initiated, the number of times the BEGIN message is thus initiated being limited, for example, to five times.

Figure 5:
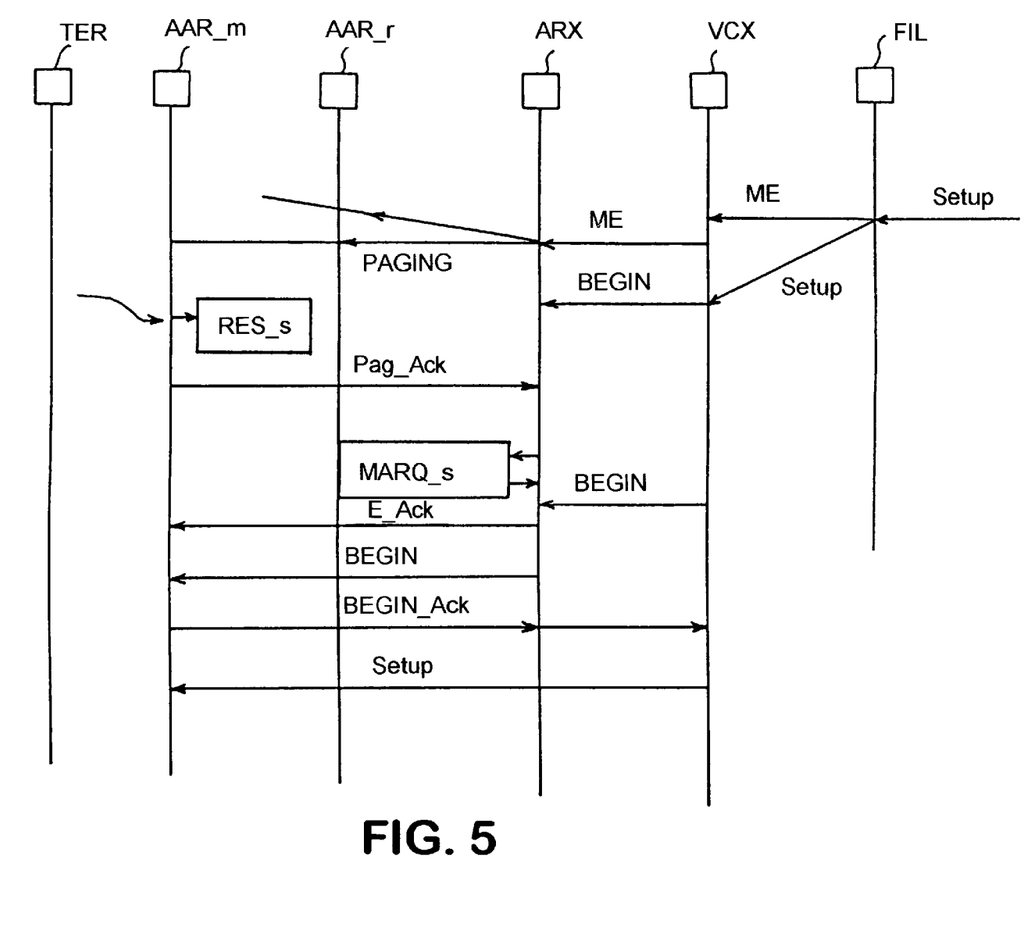
FIG. 5 illustrates the functioning of a network according to another embodiment of the invention, also in the case where any terminal whatsoever calls another terminal in the area covered by said network.

Another embodiment of the invention for also solving the above problem is shown in FIG. 5.

According to this embodiment, the signalling messages normaly transmitted to the switching circuit VCX first passes through a server or filter FIL. The function of this is to filter messages and, on receipt of such a Setup message corresponding to an incoming call (call from a terminal MT which is in the area covered by the access network), to transmit to the adaptation server ARX, via the switching circuit VCX or by a special connection, a release message ME for the terminal-paging procedure (PAGING). Intercepted by the server ARX, this message ME releases the PAGING procedure, which is then the same as the one described with reference to the preceding embodiment used.

The continuation of the procedure is identical to the one concerning the preceding embodiment.

In fact, the PAGING procedure releases the procedure RES_s which reserves the radio resources required for the signalling traffic. A message Pag_Ack is then transmitted to the server ARX, in the same way as in the preceding embodiment, orders the marking MARQ_s of the signalling channel in the network RLA. Once this operation is completed, an acknowledgement message E_Ack is transmitted to the terminal MT.

During this time, the switching circuit VCX periodically sends release messages BEGIN which, when the signalling channel is set up, is transmitted to the terminal MT. It then responds by an acknowledgement message BEGIN_Ack.

When the connections between a terminal MT and the switching circuit VCX are released, the switching circuit VCX periodically sends release messages BEGIN, this does not have the same effect as before, i.e. of releasing the terminal-paging procedure (PAGING). In fact, it is not released by such a BEGIN message but by a specific message ME sent by the server FIL.

The user could establish several communications successively from its terminal MT by "superimposing" them; for example, it begins with an interpersonal communication such as a videophone and subsequently provides additional information on the Internet. In this case, it is useless to open another signalling channel, the preliminary phase then becomes useless prior to setting up the call to the Internet.

To release the communication by the network, the switching circuit VCX sends a Release message to the terminal MT. If the terminal MT is the origin of the release of the communication, then it sends a Release message.

In any event, the server ARX intercepts this Release message and releases the internal protocol PRSS, the object of which is to release the partial ATM connections for signal transmission and data traffic, as well as the release of radio resources. The connection for transmitting security protocol messages SSCOP is now physically interrupted. The terminals MT and the switching circuit VCX will attempt in vain to reestablish it by sending BEGIN messages, whether indefinitely or for a limited number of times.

After release of a communication, the server ARX sets a temporary delay which is sufficiently long to conceal all BEGIN messages coming from the switching circuit VCX and which has the same virtual path identifier VPI_u as the one used for said communication. In fact, the server ARX should absolutely ignore these BEGIN messages, otherwise it will initiate a preliminary phase for paging the terminal (PAGING) which makes no sense in this case.

In the event that the user has initiated a multimedia application, the release will only release the resources which were used by the interrupted communication. The signalling channel will remain open.

What is claimed is:

1. An access network for mobile terminals of the type which comprises: a plurality of radio terminals (BR), a local access network (RLA), a switching circuit (VCX) connected, on the one hand, to at least one other external network and, on the other hand, to said local access network (RLA); said local access network being connected to a number of said radio terminals (BR); each of said terminals (BR) communicating by means of radio resources with mobile terminals (MT); said access network being characterized therein that set-up and release protocols provide for establishing signaling channels and user channels between said switching circuit (VCX) and a mobile terminal (MT) and security protocols (SSCOP) of said channels are implemented, only at the level of said switching circuit (VCX) and said mobile terminals (MT), by exchanging signaling messages between said switching circuit (VCX) and said mobile terminals (MT), and an adaptation server (ARX) which is provided for intercepting, in a transparent manner, the messages sent by said setup and release protocols for implementing, dependent on the contents of said intercepted messages, management protocols of said local access network (RLA) in order to set up and release the signaling channels and the user channels in the said local access network and to reserve corresponding radio resources for said set up and release.

2. An access network for mobile terminals according to claim 1, characterized therein that, when the switching circuit (VCX) receives a request for a connection (Setup) with a mobile terminal (MT) which is in the area covered by said local access network (RLA), a terminal paging protocol (PAGING) is initiated by said adaptation server (ARX) to which said mobile terminal (MT) responds by reserving the radio resources required for signaling traffic (RES_s) and by sending an acknowledgment message (PAGING_Ack), said server (ARX) determining virtual path identifiers and virtual circuit identifiers (VPI, VCI_sig) of a signaling channel in said local access network (RLA) and establishing said signaling channel.

3. An access network according to claim 2, characterized therein that, when said switching circuit (VCX) receives a request for a connection (Setup) with a mobile terminal (MT) which is in the area covered by said local access network (RLA), said switching circuit sends a release message for a security protocol (BEGIN); an interception of said release message by said server (ARX) releasing said terminal paging protocol (PAGING), said mobile terminal (MT) transmitting an acknowledgment message (BEGIN_Ack) when said signaling channel is set up between said mobile terminal (MT) and said switching circuit (VCX).

4. An access network according to claim 3, characterized therein that, if the switching circuit (VCX) has not received an acknowledgment message (BEGIN_Ack) on expiration of a preset period of time, said switching circuit sends a new release message for the security protocol (BEGIN), the number of times that the switching circuiting circuit (VCX) resends the release messages for the security protocol (BEGIN) being limited.

5. An access network for mobile terminals according to the preceding claim 2, characterized therein that said network comprises a server (FIL) through which all of the signaling messages pass to said switching circuit (VCX), said server (FIL), on receipt of a message requesting a connection (Setup) with a mobile terminal (MT) which is in the area covered by said local access network (RLA), transmitting to the server (ARX) a message (ME) so that it releases said terminal-paging process (PAGING), said mobile terminal (MT) transmitting an acknowledgment message (BEGIN_Ack) when said signaling channel is set up between said mobile terminal (MT) and said switching circuit (VCX).

6. An access network for mobile terminals according to any one of the preceding claims, characterized therein that, when a mobile terminal (MT) which is in the area covered by said network makes a call, said network reserves the radio resources required for the signaling traffic (RES_s), and sends a message to request the connection (Req) to virtual path identifiers and virtual circuit sole adaptation server (ARX) which then determines the identifiers (VPI, VCI_sig) of a signaling channel in said local access network and sets up said signaling channel.

7. An access network for mobile terminals according to claim 1, characterized therein that a connection request message (Req) contains a temporary logical address (@mobile) which was allocated to said mobile terminal (MT) when it was in a dormant state in the area covered by said local access network (RLA), said server (ARX), on receipt of said message (Req), establishing a correspondence between said logical address (@mobile) and identifiers (VPI, VCI_sig) of said signaling channel.

8. An access network for mobile terminals according to claim 7, characterized therein that at an end of the set-up of said signaling channel, a security protocol (SSCOP) for security of the connection between the switching circuiting circuit (VCX) and said mobile terminal (MT) is released.

9. An access network for mobile terminals according to claim 8, characterized therein that, when the signaling channel is set up in said local network (RLA) and after release of the security protocol (SSCOP), a protocol for setting up the connection at the user level is implemented, the adaptation server (ARX) intercepting the messages sent by said protocol in order to reserve the radio resources required for the user traffic and setting up a user channel in said local access network (RLA).

10. An access network for mobile terminals according to claim 1, characterized therein that said local access network (RLA) comprises a distribution network (RD) connected, for its connection to the switching circuit (VCX) to a virtual path mixer (PONT), said adaptation server (ARX) being shunt-connected with said mixer (PONT) in such a way that only the cells having heading specific channel identifiers or signaling channel identifiers at the level of said switching circuit (VCX) or at the level of said mobile terminals (MT), pass through said adaptation server (ARX).

11. An access network for mobile terminals according to claim 10, characterized therein that a permanent point-to-point channel is established between each radio terminal (BR) and the adaptation server (ARX) for transmitting cells having message for requesting a connection (Req) coming from said calling mobile terminal (MT) located in a corresponding area covered by the radio terminal (BR) or the cells having an acknowledgment message for paging the terminal (PAGING_Ack.).

12. An access network for mobile terminals according to claim 11, characterized therein that a permanent virtual path is established between the adaptation server (ARX) and each radio terminal (BR) for the transmission of cells having the acknowledgment message for setting up a signaling channel (E_Ack), said cells having a virtual circuit identifier equal to the virtual circuit identifier (VCI_sig) of said signaling channel.

13. An access network for mobile terminals according to claim 12, characterized therein that a permanent point-to-multipoint channel is established between the adaptation server (ARX) and the radio terminals (BR) of said network for distributing a terminal-paging message (PAGING).

14. An access network for mobile terminals according to claim 13, characterized therein that, when said adaptation server (ARX) intercepts a release message (Release) coming either from the switching circuit (VCX) or from a mobile terminal (MT), said adaptation server (ARX) commands the release of the partial connections in the local access network (RLA) and radio resources.

15. An access network for mobile terminals according to claim 14, characterized therein that said network comprises means for concealing, for a preset period of time, the release message of the security protocol (BEGIN) sent by the switching circuit (VCX) or a mobile terminal (MT), once the signaling channel has been released.

\* \* \* \* \*